United States Patent
Xu et al.

(10) Patent No.: US 10,779,313 B2
(45) Date of Patent: Sep. 15, 2020

(54) UPLINK DATA TRANSMISSION METHOD AND APPARATUS

(71) Applicant: Huawei Technologies Co., Ltd., Shenzhen, Guangdong (CN)

(72) Inventors: Xiaoying Xu, Shanghai (CN); Xiaoxiao Zheng, Shanghai (CN); Lingli Pang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/897,035

(22) Filed: Feb. 14, 2018

(65) Prior Publication Data
US 2018/0176940 A1 Jun. 21, 2018

Related U.S. Application Data

(63) Continuation of application No. PCT/CN2015/087865, filed on Aug. 21, 2015.

(51) Int. Cl.
*H04W 72/04* (2009.01)
*H04W 72/12* (2009.01)
(Continued)

(52) U.S. Cl.
CPC ....... *H04W 72/1284* (2013.01); *H04L 5/1453* (2013.01); *H04W 28/16* (2013.01);
(Continued)

(58) Field of Classification Search
CPC ......... H04W 72/1284; H04W 72/1205; H04W 72/02; H04W 72/0413; H04W 72/082;
(Continued)

(56) References Cited

U.S. PATENT DOCUMENTS

2008/0233964 A1* 9/2008 McCoy ............. H04W 72/1284
455/450
2010/0014474 A1 1/2010 Miki et al.
(Continued)

FOREIGN PATENT DOCUMENTS

CN 101536391 A 9/2009
CN 101686110 A 3/2010
(Continued)

OTHER PUBLICATIONS

"3rd Generation Partnership Project; Technical Specification Group Services and System Aspects; Study on Machine-Type Communications (MTC) and other mobile data applications communications enhancements (Release 12)"; 3GPP TR 23.887 V12.0.0; Dec. 2013; 151 pages.

*Primary Examiner* — Hassan Kizou
*Assistant Examiner* — Mahbubul Bar Chowdhury
(74) *Attorney, Agent, or Firm* — Slater Matsil, LLP

(57) ABSTRACT

Embodiments of the present disclosure disclose an uplink data transmission method and apparatus. The method may include: generating uplink scheduling information according to an obtained scheduling information generation rule, where the uplink scheduling information includes at least a modulation and coding scheme; and when uplink data needs to be sent, modulating and encoding the uplink data by using the modulation and coding scheme, and sending the modulated and encoded uplink data to an access device. According to the embodiments of the present disclosure, uplink data sending efficiency of user equipment can be improved.

9 Claims, 6 Drawing Sheets

(51) Int. Cl.

| | |
|---|---|
| *H04W 28/16* | (2009.01) |
| *H04W 72/02* | (2009.01) |
| *H04L 5/14* | (2006.01) |
| *H04W 28/18* | (2009.01) |
| *H04W 72/08* | (2009.01) |
| *H04W 52/36* | (2009.01) |

(52) U.S. Cl.
CPC ........... *H04W 28/18* (2013.01); *H04W 72/02* (2013.01); *H04W 72/0413* (2013.01); *H04W 72/1205* (2013.01); *H04W 52/365* (2013.01); *H04W 72/042* (2013.01); *H04W 72/082* (2013.01); *H04W 72/085* (2013.01)

(58) Field of Classification Search
CPC . H04W 72/042; H04W 72/085; H04W 28/18; H04W 28/16; H04W 52/365; H04L 5/1453
See application file for complete search history.

(56) References Cited

U.S. PATENT DOCUMENTS

| | | | | |
|---|---|---|---|---|
| 2011/0176500 | A1* | 7/2011 | Wager | H04W 74/006 370/329 |
| 2012/0099453 | A1* | 4/2012 | Sagfors | H04L 5/0007 370/252 |
| 2012/0263095 | A1* | 10/2012 | Quan | H04W 52/0216 370/312 |
| 2014/0161108 | A1* | 6/2014 | Lohr | H04L 5/0007 370/336 |
| 2015/0245326 | A1 | 8/2015 | Rune et al. | |
| 2015/0319776 | A1* | 11/2015 | Seo | H04B 7/208 370/329 |
| 2016/0081115 | A1 | 3/2016 | Pang et al. | |
| 2016/0218838 | A1* | 7/2016 | Cui | H04L 5/00 |
| 2017/0105229 | A1* | 4/2017 | Luo | H04W 72/042 |
| 2018/0014255 | A1* | 1/2018 | Pelletier | H04W 52/146 |
| 2018/0041957 | A1* | 2/2018 | Xiong | H04W 74/0883 |
| 2018/0255543 | A1* | 9/2018 | Takeda | H04B 1/713 |

FOREIGN PATENT DOCUMENTS

| | | |
|---|---|---|
| CN | 101945445 A | 1/2011 |
| WO | 2014070049 A1 | 5/2014 |
| WO | 2015116866 A1 | 8/2015 |

\* cited by examiner

UPLINK DATA TRANSMISSION METHOD AND APPARATUS

CROSS-REFERENCE TO RELATED APPLICATIONS

This application is a continuation of International Application No. PCT/CN2015/087865, filed on Aug. 21, 2015, the disclosure of which is hereby incorporated by reference in its entirety.

TECHNICAL FIELD

The present application relates to the communications field, and in particular, to an uplink data transmission method and apparatus.

BACKGROUND

As communications devices are widely applied, increasingly more data packets are transmitted. Currently, when user equipment needs to send uplink data, a radio resource control (RRC) connection and a non-access stratum connection usually need to be set up first, and the uplink data is sent after a service bearer is set up.

In the foregoing technology, before sending the uplink data, the user equipment needs to establish the RRC connection and the non-access stratum connection and request a network to schedule an uplink resource. Consequently, uplink data sending efficiency of the user equipment is low.

SUMMARY

Embodiments of the present disclosure provide an uplink data transmission method and apparatus, so as to improve uplink data sending efficiency of user equipment.

According to a first aspect, an embodiment of the present disclosure provides an uplink data transmission method, including:

generating uplink scheduling information according to an obtained scheduling information generation rule, where the uplink scheduling information includes at least a modulation and coding scheme; and when uplink data needs to be sent, modulating and encoding the uplink data by using the modulation and coding scheme, and sending the modulated and encoded uplink data to an access device.

In a first possible implementation of the first aspect, the uplink scheduling information further includes a transport block size.

With reference to the first aspect, in a second possible implementation of the first aspect, the method further includes:

receiving a correspondence that is sent by the access device and that is between a modulation and coding scheme and uplink physical resource information; and the sending the modulated and encoded uplink data to an access device includes:

selecting, according to the correspondence, uplink physical resource information that can use the modulation and coding scheme, and sending the modulated and encoded uplink data to the access device by using an uplink physical resource corresponding to the selected uplink physical resource information, so that the access device determines, according to the uplink physical resource, a modulation and coding scheme used by the uplink data.

With reference to the first aspect, the first possible implementation of the first aspect, or the second possible implementation of the first aspect, in a third possible implementation of the first aspect, the generating uplink scheduling information according to an obtained scheduling information generation rule includes:

obtaining a current uplink interference level, and obtaining, according to an obtained mapping relationship between an uplink interference level and uplink scheduling information, uplink scheduling information corresponding to the current uplink interference level; or obtaining current uplink load, and obtaining, according to an obtained mapping relationship between uplink load and uplink scheduling information, uplink scheduling information corresponding to the current uplink load; or obtaining current location information, and obtaining, according to an obtained mapping relationship between location information and uplink scheduling information, uplink scheduling information corresponding to the current location information, where the location information includes at least one of the following:

available transmit power, UE transmission power headroom (UPH), a path loss, or signal strength; or obtaining a downlink channel condition, estimating a current uplink channel condition according to the downlink channel condition, and obtaining, according to an obtained mapping relationship between an uplink channel condition and uplink scheduling information, uplink scheduling information corresponding to the current uplink channel condition.

With reference to the first aspect, the first possible implementation of the first aspect, the second possible implementation of the first aspect, or the third possible implementation of the first aspect, in a fourth possible implementation of the first aspect, before the step of generating uplink scheduling information according to an obtained scheduling information generation rule, the method further includes:

receiving indication information sent by the access device, where the indication information is used to indicate N types of uplink scheduling information that are allowed to be used to send the uplink data, and N is an integer greater than or equal to 2.

With reference to the first aspect, the first possible implementation of the first aspect, or the third possible implementation of the first aspect, in a fifth possible implementation of the first aspect, the sending the modulated and encoded uplink data to an access device includes:

sending uplink information to the access device by using an uplink data channel, where the uplink information includes the modulated and encoded uplink data, and further includes control information, and the control information is at least used to indicate one type of information included in the uplink scheduling information.

With reference to the first aspect, the first possible implementation of the first aspect, or the third possible implementation of the first aspect, in a sixth possible implementation of the first aspect, the sending the modulated and encoded uplink data to an access device includes:

sending the modulated and encoded uplink data to the access device by using an uplink data channel; and the method further includes:

sending control information to the access device by using an uplink control channel, where the control information is at least used to indicate one type of information included in the uplink scheduling information.

With reference to the sixth possible implementation of the first aspect, in a seventh possible implementation of the first aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

With reference to the sixth possible implementation of the first aspect or the seventh possible implementation of the first aspect, in an eighth possible implementation of the first aspect, the uplink control channel is a dedicated uplink control channel; or the uplink control channel is a contended uplink control channel, the control information is further used to indicate an identifier of user equipment, and the control information is control information scrambled by using scrambling information, where the scrambling information includes the identifier of the user equipment, a predefined character sequence, or a preconfigured character sequence.

With reference to any one of the foregoing possible implementations of the first aspect, in a ninth possible implementation of the first aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

According to a second aspect, an embodiment of the present disclosure provides an uplink data transmission method, including:

obtaining uplink scheduling information used by user equipment to send uplink data, where the uplink scheduling information is uplink scheduling information generated by the user equipment according to an obtained scheduling information generation rule, and the uplink scheduling information includes at least a modulation and coding scheme; and performing, by using the uplink scheduling information, receiving processing on the uplink data sent by the user equipment, where the uplink data is modulated and encoded by the user equipment by using the modulation and coding scheme.

In a first possible implementation of the second aspect, the uplink scheduling information further includes a transport block size.

With reference to the second aspect, in a second possible implementation of the second aspect, the method further includes:

sending a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information; and the obtaining uplink scheduling information used by user equipment to send uplink data includes:

selecting, according to the correspondence, a modulation and coding scheme corresponding to the uplink physical resource used by the user equipment to send the uplink data, and using the selected modulation and coding scheme as a modulation and coding scheme used by the user equipment to send the uplink data.

With reference to the second aspect or the first possible implementation of the second aspect, in a third possible implementation of the second aspect, the method further includes:

sending indication information to the user equipment, where the indication information is used to indicate N types of uplink scheduling information that are allowed to be used by the user equipment to send the uplink data, and N is an integer greater than or equal to 2; and the obtaining uplink scheduling information used by user equipment to send uplink data includes:

detecting, in the N types of uplink scheduling information in a blind detection manner, the uplink scheduling information used by the user equipment to send the uplink data.

With reference to the second aspect or the first possible implementation of the second aspect, in a fourth possible implementation of the second aspect, the obtaining uplink scheduling information used by user equipment to send uplink data includes:

obtaining, according to control information sent by the user equipment, the uplink scheduling information used by the user equipment to send the uplink data, where the control information is at least used to indicate one type of information included in the uplink scheduling information.

With reference to the fourth possible implementation of the second aspect, in a fifth possible implementation of the second aspect, the control information indicates the modulation and coding scheme or the transport block size included in the uplink scheduling information; and the obtaining, according to control information sent by the user equipment, the uplink scheduling information used by the user equipment to send the uplink data includes:

selecting, according to an obtained mapping relationship between a modulation and coding scheme and uplink scheduling information, uplink scheduling information corresponding to the modulation and coding scheme as the uplink scheduling information used by the user equipment to send the uplink data; or selecting, according to an obtained mapping relationship between a transport block size and uplink scheduling information, uplink scheduling information corresponding to the transport block size as the uplink scheduling information used by the user equipment to send the uplink data.

With reference to the fourth possible implementation of the second aspect or the fifth possible implementation of the second aspect, in a sixth possible implementation of the second aspect, the method further includes:

receiving uplink information sent by the user equipment by using an uplink data channel, where the uplink information includes the uplink data and the control information.

With reference to the fourth possible implementation of the second aspect or the fifth possible implementation of the second aspect, in a seventh possible implementation of the second aspect, the method further includes:

receiving the control information sent by the user equipment by using an uplink control channel.

With reference to the seventh possible implementation of the second aspect, in an eighth possible implementation of the second aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a resource location of the control information on the uplink control channel.

With reference to the seventh possible implementation of the second aspect or the eighth possible implementation of the second aspect, in a ninth possible implementation of the second aspect, the uplink control channel is a dedicated uplink control channel; or the uplink control channel is a contended uplink control channel, the control information is further used to indicate an identifier of the user equipment, and the control information is control information scrambled by using scrambling information, where the scrambling information includes the identifier of the user equipment, a predefined character sequence, or a preconfigured character sequence.

With reference to any one of the foregoing possible implementations of the second aspect, in a tenth possible implementation of the second aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

With reference to any one of the foregoing possible implementations of the second aspect, in an eleventh possible implementation of the second aspect, the method further includes:

sending the scheduling information generation rule to the user equipment, so that the user equipment generates the uplink scheduling information according to the scheduling information generation rule.

According to a third aspect, an embodiment of the present disclosure provides an uplink data transmission apparatus, including: a generation unit, and a first sending unit, where the generation unit is configured to generate uplink scheduling information according to an obtained scheduling information generation rule, where the uplink scheduling information includes at least a modulation and coding scheme; and the first sending unit is configured to: when uplink data needs to be sent, modulate and encode the uplink data by using the modulation and coding scheme, and send the modulated and encoded uplink data to an access device.

In a first possible implementation of the third aspect, the uplink scheduling information further includes a transport block size.

With reference to the third aspect, in a second possible implementation of the third aspect, the apparatus further includes:

a first receiving unit, configured to receive a correspondence that is sent by the access device and that is between a modulation and coding scheme and uplink physical resource information; and the first sending unit is configured to: select, according to the correspondence, uplink physical resource information that can use the modulation and coding scheme, and send the modulated and encoded uplink data to the access device by using an uplink physical resource corresponding to the selected uplink physical resource information, so that the access device determines, according to the uplink physical resource, a modulation and coding scheme used by the uplink data.

With reference to the third aspect, the first possible implementation of the third aspect, or the second possible implementation of the third aspect, in a third possible implementation of the third aspect, the generation unit is configured to: obtain a current uplink interference level, and obtain, according to an obtained mapping relationship between an uplink interference level and uplink scheduling information, uplink scheduling information corresponding to the current uplink interference level; or the generation unit is configured to: obtain current uplink load, and obtain, according to an obtained mapping relationship between uplink load and uplink scheduling information, uplink scheduling information corresponding to the current uplink load; or the generation unit is configured to: obtain current location information, and obtain, according to an obtained mapping relationship between location information and uplink scheduling information, uplink scheduling information corresponding to the current location information, where the location information includes at least one of the following:

available transmit power, user equipment (UE) transmission power headroom (UPH), a path loss, or signal strength; or obtain a downlink channel condition, estimate a current uplink channel condition according to the downlink channel condition, and obtain, according to an obtained mapping relationship between an uplink channel condition and uplink scheduling information, uplink scheduling information corresponding to the current uplink channel condition.

With reference to the third aspect, the first possible implementation of the third aspect, the second possible implementation of the third aspect, or the third possible implementation of the third aspect, in a fourth possible implementation of the third aspect, the apparatus further includes:

a second receiving unit, configured to receive indication information sent by the access device, where the indication information is used to indicate N types of uplink scheduling information that are allowed to be used to send the uplink data, and N is an integer greater than or equal to 2.

With reference to the third aspect, the first possible implementation of the third aspect, or the third possible implementation of the third aspect, in a fifth possible implementation of the third aspect, the first sending unit is configured to send uplink information to the access device by using uplink data channel, where the uplink information includes the modulated and encoded uplink data, and further includes control information, and the control information is at least used to indicate one type of information included in the uplink scheduling information.

With reference to the third aspect, the first possible implementation of the third aspect, or the third possible implementation of the third aspect, in a sixth possible implementation of the third aspect, the first sending unit is configured to send the modulated and encoded uplink data to the access device by using an uplink data channel; and the apparatus further includes:

a second sending unit, configured to send control information to the access device by using an uplink control channel, where the control information is at least used to indicate one type of information included in the uplink scheduling information.

With reference to the sixth possible implementation of the third aspect, in a seventh possible implementation of the third aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

With reference to the sixth possible implementation of the third aspect or the seventh possible implementation of the third aspect, in an eighth possible implementation of the third aspect, the uplink control channel is a dedicated uplink control channel; or the uplink control channel is a contended uplink control channel, the control information is further used to indicate an identifier of user equipment, and the control information is control information scrambled by using scrambling information, where the scrambling information includes the identifier of the user equipment, a predefined character sequence, or a preconfigured character sequence.

With reference to any one of the foregoing possible implementations of the third aspect, in a ninth possible implementation of the third aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

According to a fourth aspect, an embodiment of the present disclosure provides an uplink data transmission apparatus, including: an obtaining unit and a processing unit, where the obtaining unit is configured to obtain uplink scheduling information used by user equipment to send uplink data, where the uplink scheduling information is uplink scheduling information generated by the user equipment according to an obtained scheduling information generation rule, and the uplink scheduling information includes at least a modulation and coding scheme; and the processing unit is configured to perform, by using the uplink scheduling information, receiving processing on the uplink data sent by the user equipment, where the uplink data is modulated and encoded by the user equipment by using the modulation and coding scheme.

In a first possible implementation of the fourth aspect, the uplink scheduling information further includes a transport block size.

With reference to the fourth aspect, in a second possible implementation of the fourth aspect, the apparatus further includes:

a first sending unit, configured to send a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information; and the obtaining unit is configured to: select, according to the correspondence, a modulation and coding scheme corresponding to the uplink physical resource used by the user equipment to send the uplink data, and use the selected modulation and coding scheme as modulation and coding scheme used by the user equipment to send the uplink data.

With reference to the fourth aspect or the first possible implementation of the fourth aspect, in a third possible implementation of the fourth aspect, the apparatus further includes:

a second sending unit, configured to send indication information to the user equipment, where the indication information is used to indicate N types of uplink scheduling information that are allowed to be used by the user equipment to send the uplink data, and N is an integer greater than or equal to 2; and the obtaining unit is configured to detect, in the N types of uplink scheduling information in a blind detection manner, the uplink scheduling information used by the user equipment to send the uplink data.

With reference to the fourth aspect or the first possible implementation of the fourth aspect, in a fourth possible implementation of the fourth aspect, the obtaining unit is configured to obtain, according to control information sent by the user equipment, the uplink scheduling information used by the user equipment to send the uplink data, where the control information is at least used to indicate one type of information included in the uplink scheduling information.

With reference to the fourth possible implementation of the fourth aspect, in a fifth possible implementation of the fourth aspect, the control information indicates the modulation and coding scheme or the transport block size included in the uplink scheduling information; and the obtaining unit is configured to select, according to an obtained mapping relationship between a modulation and coding scheme and uplink scheduling information, uplink scheduling information corresponding to the modulation and coding scheme as the uplink scheduling information used by the user equipment to send the uplink data; or the obtaining unit is configured to select, according to an obtained mapping relationship between a transport block size and uplink scheduling information, uplink scheduling information corresponding to the transport block size as the uplink scheduling information used by the user equipment to send the uplink data.

With reference to the fourth possible implementation of the fourth aspect or the fifth possible implementation of the fourth aspect, in a sixth possible implementation of the fourth aspect, the apparatus further includes:

a first receiving unit, configured to receive uplink information sent by the user equipment by using an uplink data channel, where the uplink information includes the uplink data and the control information.

With reference to the fourth possible implementation of the fourth aspect or the fifth possible implementation of the fourth aspect, in a seventh possible implementation of the fourth aspect, the apparatus further includes:

a second receiving unit, configured to receive the control information sent by the user equipment by using an uplink control channel.

With reference to the seventh possible implementation of the fourth aspect, in an eighth possible implementation of the fourth aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a resource location of the control information on the uplink control channel.

With reference to the seventh possible implementation of the fourth aspect or the eighth possible implementation of the fourth aspect, in a ninth possible implementation of the fourth aspect, the uplink control channel is a dedicated uplink control channel; or the uplink control channel is a contended uplink control channel, the control information is further used to indicate an identifier of the user equipment, and the control information is control information scrambled by using scrambling information, where the scrambling information includes the identifier of the user equipment, a predefined character sequence, or a preconfigured character sequence.

With reference to any one of the foregoing possible implementations of the fourth aspect, in a tenth possible implementation of the fourth aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

With reference to any one of the foregoing possible implementations of the fourth aspect, in an eleventh possible implementation of the fourth aspect, the apparatus further includes:

a third sending unit, configured to send the scheduling information generation rule to the user equipment, so that the user equipment generates the uplink scheduling information according to the scheduling information generation rule.

According to a fifth aspect, an embodiment of the present disclosure provides an uplink data transmission apparatus, including: a processor, a network interface, a memory, and a communications bus, where the communications bus is configured to implement connections and communication between the processor, the network interface, and the memory, and the processor executes a program stored in the memory, to implement the following method:

generating uplink scheduling information according to an obtained scheduling information generation rule, where the uplink scheduling information includes at least a modulation and coding scheme; and when uplink data needs to be sent, modulating and encoding the uplink data by using the modulation and coding scheme, and sending the modulated and encoded uplink data to an access device.

In a first possible implementation of the fifth aspect, the uplink scheduling information further includes a transport block size.

With reference to the fifth aspect, in a second possible implementation of the fifth aspect, the processor is further configured to execute the following program:

receiving a correspondence that is sent by the access device and that is between a modulation and coding scheme and uplink physical resource information; and the program, executed by the processor, of sending the modulated and encoded uplink data to an access device includes:

selecting, according to the correspondence, uplink physical resource information that can use the modulation and coding scheme, and sending the modulated and encoded uplink data to the access device by using an uplink physical resource corresponding to the selected uplink physical resource information, so that the access device determines, according to the uplink physical resource, a modulation and coding scheme used by the uplink data.

With reference to the fifth aspect, the first possible implementation of the fifth aspect, or the second possible implementation of the fifth aspect, in a third possible implementation of the fifth aspect, the program, executed by the processor, of generating uplink scheduling information according to an obtained scheduling information generation rule includes:

obtaining a current uplink interference level, and obtaining, according to an obtained mapping relationship between an uplink interference level and uplink scheduling information, uplink scheduling information corresponding to the current uplink interference level; or obtaining current uplink load, and obtaining, according to an obtained mapping relationship between uplink load and uplink scheduling information, uplink scheduling information corresponding to the current uplink load; or obtaining current location information, and obtaining, according to an obtained mapping relationship between location information and uplink scheduling information, uplink scheduling information corresponding to the current location information, where the location information includes at least one of the following:

available transmit power, user equipment (UE) transmission power headroom (UPH), a path loss, or signal strength; or obtaining a downlink channel condition, estimating a current uplink channel condition according to the downlink channel condition, and obtaining, according to an obtained mapping relationship between an uplink channel condition and uplink scheduling information, uplink scheduling information corresponding to the current uplink channel condition.

With reference to the fifth aspect, the first possible implementation of the fifth aspect, the second possible implementation of the fifth aspect, or the third possible implementation of the fifth aspect, in a fourth possible implementation of the fifth aspect, before the processor executes the program of generating uplink scheduling information according to an obtained scheduling information generation rule, the processor is further configured to execute the following program:

receiving indication information sent by the access device, where the indication information is used to indicate N types of uplink scheduling information that are allowed to be used to send the uplink data, and N is an integer greater than or equal to 2.

With reference to the fifth aspect, the first possible implementation of the fifth aspect, or the third possible implementation of the fifth aspect, in a fifth possible implementation of the fifth aspect, the program, executed by the processor, of sending the modulated and encoded uplink data to an access device includes:

sending uplink information to the access device by using an uplink data channel, where the uplink information includes the modulated and encoded uplink data, and further includes control information, and the control information is at least used to indicate one type of information included in the uplink scheduling information.

With reference to the fifth aspect, the first possible implementation of the fifth aspect, or the third possible implementation of the fifth aspect, in a sixth possible implementation of the fifth aspect, the program, executed by the processor, of sending the modulated and encoded uplink data to an access device includes:

sending the modulated and encoded uplink data to the access device by using an uplink data channel; and the processor is further configured to execute the following program:

sending control information to the access device by using an uplink control channel, where the control information is at least used to indicate one type of information included in the uplink scheduling information.

With reference to the sixth possible implementation of the fifth aspect, in a seventh possible implementation of the fifth aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

With reference to the sixth possible implementation of the fifth aspect or the seventh possible implementation of the fifth aspect, in an eighth possible implementation of the fifth aspect, the uplink control channel is a dedicated uplink control channel; or the uplink control channel is a contended uplink control channel, the control information is further used to indicate an identifier of user equipment, and the control information is control information scrambled by using scrambling information, where the scrambling information includes the identifier of the user equipment, a predefined character sequence, or a preconfigured character sequence.

With reference to any one of the foregoing possible implementations of the fifth aspect, in a ninth possible implementation of the fifth aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

According to a sixth aspect, an embodiment of the present disclosure provides an uplink data transmission apparatus, including: a processor, a network interface, a memory, and a communications bus, where the communications bus is configured to implement connections and communication between the processor, the network interface, and the memory, and the processor executes a program stored in the memory, to implement the following method:

obtaining uplink scheduling information used by user equipment to send uplink data, where the uplink scheduling information is uplink scheduling information generated by the user equipment according to an obtained scheduling information generation rule, and the uplink scheduling information includes at least a modulation and coding scheme; and performing, by using the uplink scheduling information, receiving processing on the uplink data sent by the user equipment, where the uplink data is modulated and encoded by the user equipment by using the modulation and coding scheme.

In a first possible implementation of the sixth aspect, the uplink scheduling information further includes a transport block size.

With reference to the sixth aspect, in a second possible implementation of the sixth aspect, the processor is further configured to execute the following program:

sending a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information; and the program, executed by the processor, of obtaining uplink scheduling information used by user equipment to send uplink data includes:

selecting, according to the correspondence, a modulation and coding scheme corresponding to the uplink physical resource used by the user equipment to send the uplink data, and using the selected modulation and coding scheme as a modulation and coding scheme used by the user equipment to send the uplink data.

With reference to the sixth aspect or the first possible implementation of the sixth aspect, in a third possible implementation of the sixth aspect, the processor is further configured to execute the following program:

sending indication information to the user equipment, where the indication information is used to indicate N types of uplink scheduling information that are allowed to be used by the user equipment to send the uplink data, and N is an integer greater than or equal to 2; and the obtaining uplink scheduling information used by user equipment to send uplink data includes:

detecting, in the N types of uplink scheduling information in a blind detection manner, the uplink scheduling information used by the user equipment to send the uplink data.

With reference to the sixth aspect or the first possible implementation of the sixth aspect, in a fourth possible implementation of the sixth aspect, the program, executed by the processor, of obtaining uplink scheduling information used by user equipment to send uplink data includes:

obtaining, according to control information sent by the user equipment, the uplink scheduling information used by the user equipment to send the uplink data, where the control information is at least used to indicate one type of information included in the uplink scheduling information.

With reference to the fourth possible implementation of the sixth aspect, in a fifth possible implementation of the sixth aspect, the control information indicates the modulation and coding scheme or the transport block size included in the uplink scheduling information; and the program, executed by the processor, of obtaining, according to control information sent by the user equipment, the uplink scheduling information used by the user equipment to send the uplink data includes:

selecting, according to an obtained mapping relationship between a modulation and coding scheme and uplink scheduling information, uplink scheduling information corresponding to the modulation and coding scheme as the uplink scheduling information used by the user equipment to send the uplink data; or selecting, according to an obtained mapping relationship between a transport block size and uplink scheduling information, uplink scheduling information corresponding to the transport block size as the uplink scheduling information used by the user equipment to send the uplink data.

With reference to the fourth possible implementation of the sixth aspect or the fifth possible implementation of the sixth aspect, in a sixth possible implementation of the sixth aspect, the processor is further configured to execute the following program:

receiving uplink information sent by the user equipment by using an uplink data channel, where the uplink information includes the uplink data and the control information.

With reference to the fourth possible implementation of the sixth aspect or the fifth possible implementation of the sixth aspect, in a seventh possible implementation of the sixth aspect, the processor is further configured to execute the following program:

receiving the control information sent by the user equipment by using an uplink control channel.

With reference to the seventh possible implementation of the sixth aspect, in an eighth possible implementation of the sixth aspect, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a resource location of the control information on the uplink control channel.

With reference to the seventh possible implementation of the sixth aspect or the eighth possible implementation of the sixth aspect, in a ninth possible implementation of the sixth aspect, the uplink control channel is a dedicated uplink control channel; or the uplink control channel is a contended uplink control channel, the control information is further used to indicate an identifier of the user equipment, and the control information is control information scrambled by using scrambling information, where the scrambling information includes the identifier of the user equipment, a predefined character sequence, or a preconfigured character sequence.

With reference to any one of the foregoing possible implementations of the sixth aspect, in a tenth possible implementation of the sixth aspect, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

With reference to any one of the foregoing possible implementations of the sixth aspect, in an eleventh possible implementation of the sixth aspect, the processor is further configured to execute the following program:

sending the scheduling information generation rule to the user equipment, so that the user equipment generates the uplink scheduling information according to the scheduling information generation rule.

In the foregoing technical solutions, the uplink scheduling information is generated according to the obtained scheduling information generation rule, where the uplink scheduling information includes at least a modulation and coding scheme identifier; and when the uplink data needs to be sent, the uplink data is modulated and encoded by using a modulation and coding scheme corresponding to the modulation and coding scheme identifier, and the modulated and encoded uplink data is sent to the access device. In this way, when the uplink data is sent, there is no need to establish an RRC connection or a non-access stratum connection or send a scheduling request, a buffer status report, or a random access request. Therefore, uplink data sending efficiency of the user equipment is improved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
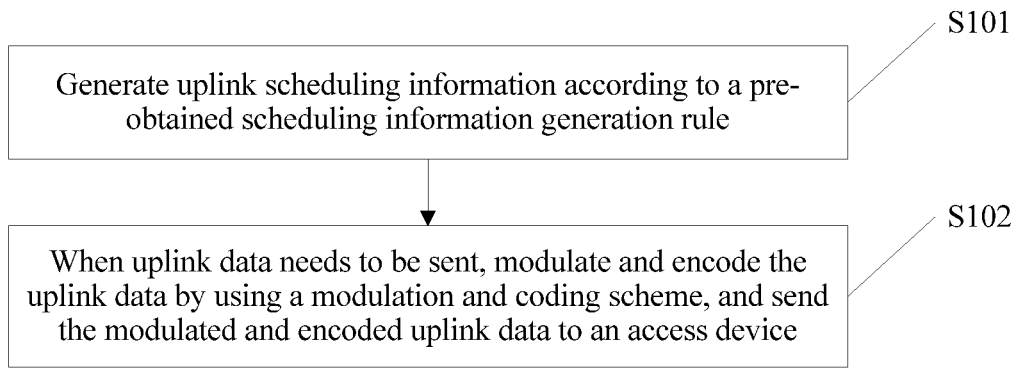
FIG. 1 is a schematic flowchart of an uplink data transmission method according to an embodiment of the present disclosure.

Referring to FIG. 1, FIG. 1 is a schematic flowchart of an uplink data transmission method according to an embodiment of the present disclosure. As shown in FIG. 1, the method includes the following steps.

S101. Generate uplink scheduling information according to an obtained scheduling information generation rule, where the uplink scheduling information includes at least a modulation and coding scheme.

In this embodiment, the scheduling information generation rule may be received in advance from an access device, for example, a scheduling information generation rule sent by a base station is received in advance, or a scheduling information generation rule sent by an access point device is received in advance. Alternatively, the scheduling information generation rule may be preset by a user, or the scheduling information generation rule may be downloaded from a server or configured by a server.

In addition, the modulation and coding scheme is corresponding to a modulation and coding scheme identifier. The modulation and coding scheme identifier is used to identify a modulation and coding scheme.

S102. When uplink data needs to be sent, modulate and encode the uplink data by using the modulation and coding scheme, and send the modulated and encoded uplink data to an access device.

In this embodiment, the uplink data may be any data, for example, service data or signaling, that needs to be sent by user equipment to the access device.

According to the foregoing steps, the uplink scheduling information can be generated before the uplink data is sent. In this way, when the uplink data is sent, there is no need to establish an RRC connection or a non-access stratum connection or send a scheduling request, a buffer status report, or a random access request, and the uplink data can be directly sent by using the generated uplink scheduling information. Therefore, uplink data sending efficiency can be improved.

In this embodiment, the foregoing method may be applied to the user equipment or a communications device, for example, a device that can send uplink data, such as a mobile phone, a computer, a tablet computer, an in-vehicle device, an intelligent home appliance, or an M2M device.

In this embodiment, the uplink scheduling information is generated according to the obtained scheduling information generation rule, where the uplink scheduling information includes at least the modulation and coding scheme; and when the uplink data needs to be sent, the uplink data is modulated and encoded by using the modulation and coding scheme, and the modulated and encoded uplink data is sent to the access device. In this way, when the uplink data is sent, there is no need to establish an RRC connection or a non-access stratum connection or send a scheduling request, a buffer status report, or a random access request. Therefore, uplink data sending efficiency of the user equipment is improved.

Figure 2:
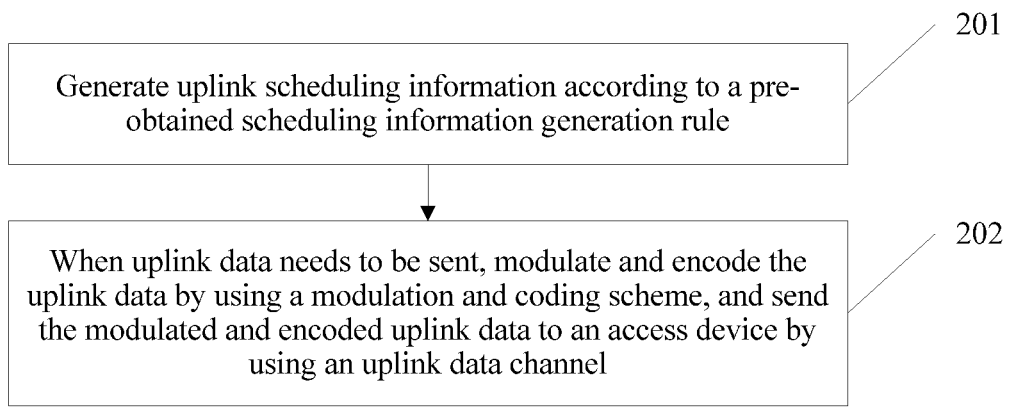
FIG. 2 is a schematic flowchart of another uplink data transmission method according to an embodiment of the present disclosure.

Referring to FIG. 2, FIG. 2 is a schematic flowchart of another uplink data transmission method according to an embodiment of the present disclosure. As shown in FIG. 2, the method includes the following steps.

201. Generate uplink scheduling information according to an obtained scheduling information generation rule, where the uplink scheduling information includes at least a modulation and coding scheme. The obtained scheduling information may be pre-obtained, or may be obtained when used.

202. When uplink data needs to be sent, modulate and encode the uplink data by using the modulation and coding scheme, and send the modulated and encoded uplink data to an access device by using an uplink data channel.

In this embodiment, the uplink scheduling information may further include a transport block size. The transport block size may be determined according to the modulation and coding scheme and a quantity of used physical resource blocks, and the modulated and encoded uplink data may be sent in the transport block size.

In this implementation, the modulation and coding scheme may be corresponding to a transport block set (TBS) index. In this way, user equipment can further determine the specific transport block size according to a modulation and coding scheme identifier and the quantity of used physical resource blocks. The quantity of used physical resource blocks may be indicated by a network device to the user equipment, or may be a fixed value, or may be notified to a network device after being selected by the user equipment.

In this embodiment, the foregoing method may further include the following step:

receiving a correspondence that is sent by the access device and that is between a modulation and coding scheme and uplink physical resource information.

The step of sending the modulated and encoded uplink data to an access device may include:

selecting, according to the correspondence, uplink physical resource information that can use the modulation and coding scheme, and sending the modulated and encoded uplink data to the access device by using an uplink physical resource corresponding to the selected uplink physical resource information, so that the access device determines, according to the uplink physical resource, a modulation and coding scheme used by the uplink data.

In this implementation, the correspondence may describe modulation and coding schemes that can be used by multiple pieces of uplink physical resource information. After the user equipment determines the modulation and coding scheme, the user equipment can select, according to indication information sent by the access device to the user equipment, the uplink physical resource that is suitable for the modulation and coding scheme, to send the uplink data, where the indication information is a correspondence between uplink physical resource information and a modulation and coding scheme that can be used by the uplink physical resource information. Therefore, in this case, the uplink scheduling information does not need to be indicated to the access device because the access device can identify, by using the uplink physical resource information used by the user equipment, the uplink scheduling information used by the user equipment. In addition, the uplink physical resource information may include information such as a quantity of physical resource blocks or a transport block size.

In this embodiment, the step of generating uplink scheduling information according to an obtained scheduling information generation rule may include:

obtaining a current uplink interference level, and obtaining, according to an obtained mapping relationship between an uplink interference level and uplink scheduling information, uplink scheduling information corresponding to the current uplink interference level; or obtaining current uplink load, and obtaining, according to an obtained mapping relationship between uplink load and uplink scheduling information, uplink scheduling information corresponding to the current uplink load.

In this way, the user equipment can generate the uplink scheduling information according to the current uplink interference level or the current uplink load.

In this embodiment, the step of generating uplink scheduling information according to an obtained scheduling information generation rule may include:

obtaining current location information, and obtaining, according to an obtained mapping relationship between location information and uplink scheduling information, uplink scheduling information corresponding to the current location information, where the location information includes at least one of the following:

available transmit power, UPH, a path loss, or signal strength.

The UPH is UPH of the user equipment.

In this way, the user equipment can generate the uplink scheduling information according to the current location information.

The described correspondence may be pre-obtained, or obtained when used.

In this embodiment, the step of generating uplink scheduling information according to an obtained scheduling information generation rule may include:

obtaining a downlink channel condition, estimating a current uplink channel condition according to the downlink channel condition, and obtaining, according to an obtained mapping relationship between an uplink channel condition and uplink scheduling information, uplink scheduling information corresponding to the current uplink channel condition.

In this way, the user equipment can generate the uplink scheduling information according to the downlink channel condition.

In this embodiment, before step 201, the method may further include the following step:

receiving indication information sent by the access device, where the indication information is used to indicate N types of uplink scheduling information that are allowed to be used to send the uplink data, and N is an integer greater than or equal to 2.

In this implementation, the access device can specify the N types of uplink scheduling information that are allowed to be used by the user equipment. In this way, the uplink scheduling information generated in step 201 is selected from the N types of uplink scheduling information. Therefore, when performing receiving processing on the uplink data sent by the user equipment, the access device can perform blind selection on the N types of uplink scheduling information, that is, receiving processing is performed on the uplink data by sequentially using the N types of uplink scheduling information until the receiving processing succeeds. Therefore, the user equipment does not need to send the uplink scheduling information to the access device, and further, may not send, to the access device, control information indicating the uplink scheduling information, and only needs to send the uplink data to the access device, so that uplink data sending efficiency can be improved, and a transmission resource can be saved.

In this embodiment, step 202 may include:

sending uplink information to the access device by using the uplink data channel, where the uplink information includes the modulated and encoded uplink data, and further includes control information, and the control information is at least used to indicate one type of information included in the uplink scheduling information.

In this implementation, the control information may be used to indicate the modulation and coding scheme in the uplink scheduling information. In this way, the access device can obtain other uplink scheduling information according to a specified correspondence between a modulation and coding scheme and other uplink scheduling information, for example, the access device obtains the transport block size according to a correspondence between a modulation and coding scheme and a transport block size, or obtains the transport block size according to the modulation and coding scheme and the quantity of used physical resource blocks. Alternatively, the control information may be used to indicate the transport block size in the uplink scheduling information. The access device then obtains other uplink scheduling information such as the modulation and coding scheme according to a correspondence between a transport block size and other uplink scheduling information. Alternatively, the control information may be used to indicate the transport block size, the modulation and coding scheme, and the like in the uplink scheduling information.

In this implementation, the uplink data and the control information can be simultaneously sent by using the uplink data channel, that is, the control information may be used as accompanying content on the uplink data channel. For example, the control information may be used as a first part of uplink information on a physical uplink shared channel (PUSCH), and is referred to as accompanying information. In addition, the control information may be successfully transmitted in a higher probability by using a fixed format, a low-order modulation and coding scheme, and/or large redundancy. A second part of the uplink information on the PUSCH is the uplink data.

In addition, the first part may further be used by the access device to demodulate control information of the uplink data and/or to schedule uplink data that is not successfully sent. Whether the uplink data or the control information is demodulated is indicated by a bit in a fixed format. An ID of the user equipment needs to be carried to indicate identity information of the user equipment.

Figure 3:
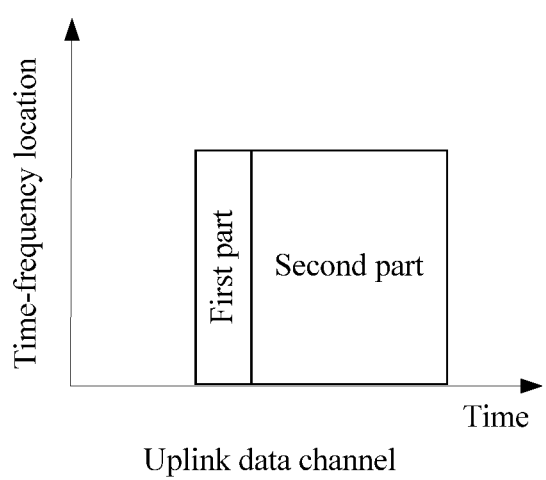
FIG. 3 is a schematic structural diagram of one type of uplink information according to an embodiment of the present disclosure.

In this implementation, as shown in FIG. 3, the first part may be the control information, and the second part may be the uplink data.

In this embodiment, the foregoing method may further include the following step:

sending control information to the access device by using an uplink control channel, where the control information is at least used to indicate one type of information included in the uplink scheduling information.

In this implementation, the control information may be used to indicate the modulation and coding scheme in the uplink scheduling information. In this way, the access device can obtain other uplink scheduling information according to a correspondence between a modulation and coding scheme and other uplink scheduling information, for example, the access device obtains the transport block size according to a correspondence between a modulation and coding scheme and a transport block size, or obtains the transport block size according to the modulation and coding scheme and the quantity of used physical resource blocks. Alternatively, the control information may be used to indicate the transport block size in the uplink scheduling information. The access device then obtains other uplink scheduling information according to a correspondence between a transport block size and other uplink scheduling information. Alternatively, the control information may be used to indicate the transport block size, the modulation and coding scheme, and the like in the uplink scheduling information.

In this implementation, the control information may be sent to the access device by using the uplink control channel. In this way, the access device can receive the uplink data on the uplink data channel according to the control information. In addition, the uplink control channel may be understood as an accompanying channel of the uplink data channel. For example, if the uplink data channel is a physical uplink shared channel (PUSCH), the uplink control channel may be an enhanced physical uplink control channel (PUSCH).

In this implementation, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

In this way, the access device can determine the resource location of the uplink data on the uplink data channel according to the control information, so as to perform receiving processing on the uplink data.

In this implementation, the uplink control channel may be a dedicated uplink control channel, or the uplink control channel is a contended uplink control channel. When the uplink control channel is a contended uplink control channel, the control information may be further used to indicate an identifier of the user equipment in an explicit or implicit manner. In the explicit manner, for example, the identifier of the UE is included in the control information. In the implicit manner, for example, the control information is control information scrambled by using scrambling information. The scrambling information includes the identifier of the user equipment, a predefined character sequence, or a preconfigured character sequence. In this way, when the contended uplink control channel is used, the access device can determine, by descrambling the identifier of the user equipment, that the control information is sent by the user equipment, and then obtain, by using the control information, the uplink data sent by the user equipment.

In this embodiment, the uplink scheduling information may further include at least one of the following:

a transmission time interval, resource information of a data channel, indication information indicating whether there is uplink data sending, duration in which the uplink data channel is used, or at least one of HARQ retransmission process information, a retransmission version, or retransmission occupation duration.

In this implementation, the user equipment may support sending at multiple types of transmission time intervals (TTI). In this way, the user equipment can select, according to a coverage status, a TTI that is suitable for sending a data part. For example, a proper TTI is selected based on the UPH. A selection condition may be indicated by using network broadcast. The resource information of the data channel may include information such as a time-frequency location of the uplink data and/or a quantity of resource blocks.

In this implementation, when a plurality of HARQs are performed, a HARQ process, the retransmission version, the occupation duration, or the like may be indicated.

In addition, the uplink scheduling information may be indicated by the control information described in this embodiment. That is, the control information in this embodiment may indicate the transmission time interval and resource block information of the data channel, indicate whether there is uplink data sending and the duration in which the uplink data channel is used, and is further used to indicate at least one of the HARQ retransmission process information, the retransmission version, or the retransmission occupation duration during retransmission.

In this embodiment, based on the embodiment shown in FIG. 1, a plurality of optional implementations are added, and can improve uplink data sending efficiency.

Figure 4:
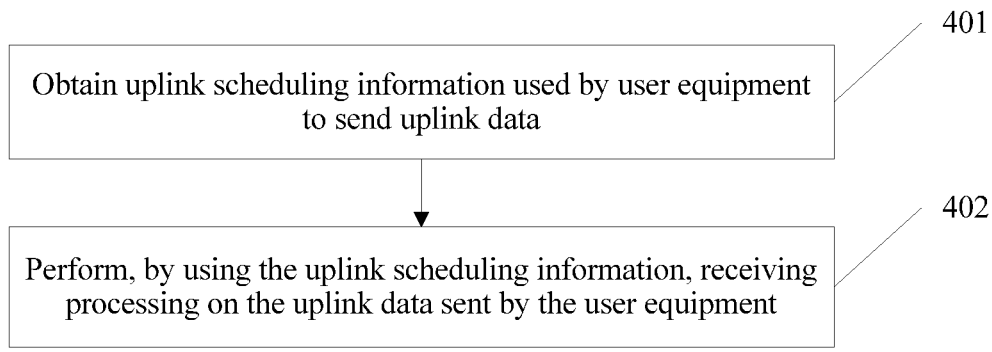
FIG. 4 is a schematic flowchart of another uplink data transmission method according to an embodiment of the present disclosure.

Referring to FIG. 4, FIG. 4 is a schematic flowchart of another uplink data transmission method according to an embodiment of the present disclosure. As shown in FIG. 4, the method includes the following steps.

401. Obtain uplink scheduling information used by user equipment to send uplink data, where the uplink scheduling information is uplink scheduling information generated by the user equipment according to an obtained scheduling information generation rule, and the uplink scheduling information includes at least a modulation and coding scheme.

In this embodiment, in step 401, the uplink scheduling information used by the user equipment to send the uplink data may be obtained before the user equipment sends the uplink data, that is, the uplink scheduling information is pre-obtained. Alternatively, in step 401, the uplink scheduling information used by the user equipment to send the uplink data may be obtained when it is detected that the user equipment sends the uplink data.

402. Perform, by using the uplink scheduling information, receiving processing on the uplink data sent by the user equipment, where the uplink data is modulated and encoded by the user equipment by using the modulation and coding scheme.

In this embodiment, the receiving processing may include identifying a time-frequency location of the uplink data, and receiving the uplink data in the corresponding time-frequency location, and may further include modulating and encoding the received uplink data.

According to the foregoing steps, the uplink scheduling information can be generated before the user equipment sends the uplink data. In this way, when the uplink data is sent, there is no need to establish an RRC connection or a non-access stratum connection or send a scheduling request, a buffer status report, or a random access request, and the uplink data can be directly sent by using the generated uplink scheduling information. Therefore, uplink data sending efficiency can be improved.

In this embodiment, the foregoing method may be applied to an access device, for example, abase station, an access point device, or a network side device.

In this embodiment, the uplink scheduling information used by the user equipment to send the uplink data is obtained, where the uplink scheduling information is the uplink scheduling information generated by the user equipment according to the pre-obtained scheduling information generation rule, and the uplink scheduling information includes at least the modulation and coding scheme; and receiving processing is performed, by using the uplink scheduling information, on the uplink data sent by the user equipment, where the uplink data is modulated and encoded by the user equipment by using the modulation and coding scheme. In this way, when the uplink data is sent, there is no need to establish an RRC connection or a non-access stratum connection or send a scheduling request or a random access request. Therefore, uplink data sending efficiency of the user equipment is improved.

Figure 5:
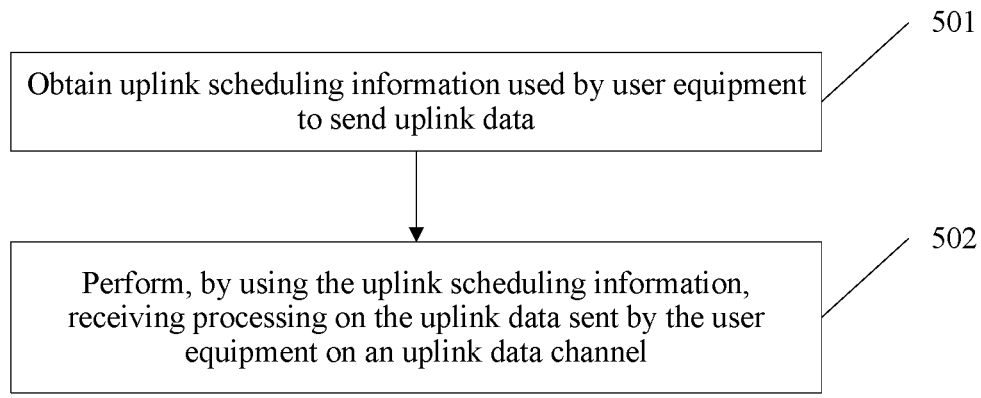
FIG. 5 is a schematic flowchart of another uplink data transmission method according to an embodiment of the present disclosure.

Referring to FIG. 5, FIG. 5 is a schematic flowchart of another uplink data transmission method according to an embodiment of the present disclosure. As shown in FIG. 5, the method includes the following steps.

501. Obtain uplink scheduling information used by user equipment to send uplink data, where the uplink scheduling information is uplink scheduling information generated by the user equipment according to an obtained scheduling information generation rule, and the uplink scheduling information includes at least a modulation and coding scheme.

In this embodiment, the uplink scheduling information may further include a transport block size. The transport block size may be determined according to the modulation and coding scheme and a quantity of used physical resource blocks, and the uplink data is sent in the transport block size.

In this implementation, the modulation and coding scheme may be corresponding to a TBS index. In this way, the user equipment can further determine the specific transport block size according to the modulation and coding scheme and the quantity of used physical resource blocks. The quantity of used physical resource blocks may be indicated by a network device to the user equipment, or may be a fixed value, or may be notified to a network device after being selected by the user equipment.

In this embodiment, the method may further include the following step:

sending the scheduling information generation rule to the user equipment, so that the user equipment generates the uplink scheduling information according to the scheduling information generation rule.

In this way, the user equipment can generate the uplink scheduling information according to the scheduling information generation rule sent by an access device.

In this embodiment, the method may further include:

sending a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information.

Step 501 may include:

selecting, according to the correspondence, a modulation and coding scheme corresponding to the uplink physical resource used by the user equipment to send the uplink data, and using the selected modulation and coding scheme as a modulation and coding scheme used by the user equipment to send the uplink data.

In this implementation, the correspondence may describe modulation and coding schemes that can be used by multiple pieces of uplink physical resource information. After the user equipment determines the modulation and coding scheme, the user equipment can select, according to indication information sent by the access device to the user equipment, the uplink physical resource that is suitable for the modulation and coding scheme, to send the uplink data, where the indication information is a correspondence between uplink physical resource information and a modulation and coding scheme that can be used by the uplink physical resource information. Therefore, in this case, the uplink scheduling information does not need to be indicated to the access device because the access device can identify, by using the uplink physical resource information used by the user equipment, the uplink scheduling information used by the user equipment. In addition, the uplink physical resource information may include information such as a quantity of physical resource blocks or a transport block size.

In this embodiment, the foregoing method may further include the following step:

sending indication information to the user equipment, where the indication information is used to indicate N types of uplink scheduling information that are allowed to be used by the user equipment to send the uplink data, and N is an integer greater than or equal to 2.

Step 501 may include:

detecting, in the N types of uplink scheduling information in a blind detection manner, the uplink scheduling information used by the user equipment to send the uplink data.

In this implementation, the access device can specify, in advance, the N types of uplink scheduling information that are allowed to be used by the user equipment. In this way, the uplink scheduling information generated by the user equipment is selected from the N types of uplink scheduling information. Therefore, when performing receiving processing on the uplink data sent by the user equipment, the access device can perform blind selection on the N types of uplink scheduling information, that is, receiving processing is performed on the uplink data by sequentially using the N types of uplink scheduling information until the receiving processing succeeds. Therefore, the user equipment does not need to send the uplink scheduling information to the access device, and further, may not send, to the access device, control information indicating the uplink scheduling information, and only needs to send the uplink data to the access device, so that uplink data sending efficiency can be improved, and a transmission resource can be saved.

In this embodiment, step 501 may include:

obtaining, according to control information sent by the user equipment, the uplink scheduling information used by the user equipment to send the uplink data, where the control information is at least used to indicate one type of information included in the uplink scheduling information.

In this implementation, the control information may indicate the modulation and coding scheme or the transport block size included in the uplink scheduling information.

The step of obtaining, according to control information sent by the user equipment, the uplink scheduling information used by the user equipment to send the uplink data may include:

selecting, according to a pre-obtained mapping relationship between a modulation and coding scheme and uplink scheduling information, uplink scheduling information corresponding to the modulation and coding scheme as the uplink scheduling information used by the user equipment to send the uplink data; or selecting, according to a pre-obtained mapping relationship between a transport block size and uplink scheduling information, uplink scheduling information corresponding to the transport block size as the uplink scheduling information used by the user equipment to send the uplink data.

For example, the control information may be used to indicate a modulation and coding scheme identifier in the uplink scheduling information. In this way, the access device can obtain other uplink scheduling information according to a preset correspondence between a modulation and coding scheme and other uplink scheduling information, for example, the access device obtains the transport block size according to a correspondence between a modulation and coding scheme identifier and a transport block size, or obtains the transport block size according to the modulation and coding scheme and the quantity of used physical resource blocks. Alternatively, the control information may be used to indicate the transport block size in the uplink scheduling information. The access device then obtains other uplink scheduling information according to a preset correspondence between a transport block size and other uplink scheduling information. Alternatively, the control information may be used to indicate the transport block size, the modulation and coding scheme, and the like in the uplink scheduling information.

In this implementation, the foregoing method may further include the following step:

receiving uplink information sent by the user equipment by using an uplink data channel, where the uplink information includes the uplink data and the control information.

In this implementation, the uplink data and the control information can be simultaneously sent by using the uplink data channel, that is, the control information may be used as accompanying content on the uplink data channel. For example, the control information may be used as a first part of uplink information on a PUSCH, and is referred to as accompanying information. In addition, the control information may be successfully transmitted in a higher probability by using a fixed format, a low-order modulation and coding scheme, and/or large redundancy. A second part of the uplink information on the PUSCH is the uplink data.

In addition, the first part may further be used by the access device to demodulate control information of the uplink data and/or to schedule uplink data that is not successfully sent. Whether the uplink data or the control information is demodulated is indicated by a bit in a fixed format. An ID of the user equipment needs to be carried to indicate identity information of the user equipment. A user identifier may be a user identifier (for example, a C-RNTI or a group RNTI) at an access stratum, or a user identifier (for example, S-TMSI or an M-TMSI) at a non-access stratum.

In this implementation, as shown in FIG. 3, the first part may be the control information, and the second part may be the uplink data.

In this implementation, the foregoing method may further include the following step:

receiving the control information sent by the user equipment by using an uplink control channel.

In this implementation, the user equipment can send the control information to the access device by using the uplink control channel. In this way, the access device can receive the uplink data on the uplink data channel according to the control information. In addition, the uplink control channel may be understood as an accompanying channel of the uplink data channel.

In this implementation, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

In this way, when performing receiving processing, the access device can determine the resource location of the uplink data on the uplink data channel according to the control information, to receive the uplink data.

In this implementation, the uplink control channel may be a dedicated uplink control channel, or the uplink control channel is a contended uplink control channel. When the uplink control channel is a contended uplink control channel, the control information may be further used to indicate an identifier of the user equipment in an explicit or implicit manner. The control information is control information scrambled by using scrambling information. The scrambling information includes the identifier of the user equipment, a predefined character sequence, or a preconfigured character sequence. In this way, when the contended uplink control channel is used, the access device can determine, by descrambling the identifier of the user equipment, that the control information is sent by the user equipment, and then obtain, by using the control information, the uplink data sent by the user equipment.

In this embodiment, the uplink scheduling information may further include at least one of the following:

a transmission time interval, resource information of a data channel, indication information indicating whether there is uplink data sending, duration in which the uplink data channel is used, or at least one of HARQ retransmission process information, a retransmission version, or retransmission occupation duration.

In this implementation, a current status of sending the uplink data by the user equipment can be obtained by using the uplink scheduling information.

In addition, the uplink scheduling information may be indicated by the control information described in this embodiment. That is, the control information in this embodiment may indicate the transmission time interval and resource block information of the data channel, indicate whether there is uplink data sending and the duration in which the uplink data channel is used, and is further used to indicate at least one of the HARQ retransmission process information, the retransmission version, or the retransmission occupation duration during retransmission. That is, the uplink scheduling information is indicated by using the control information.

502. Perform, by using the uplink scheduling information, receiving processing on the uplink data sent by the user equipment on an uplink data channel, where the uplink data is modulated and encoded by the user equipment by using the modulation and coding scheme corresponding to a modulation and coding scheme identifier.

After the uplink scheduling information is obtained in step 501, physical resource information used by the user equipment to send the uplink data may be determined, for example, a quantity of resource blocks and the transport block size, and the modulation and coding scheme used by the user equipment for the uplink data, a time-frequency resource location, and the like may be further determined, so that receiving processing can be performed on the uplink data according to the uplink scheduling information.

In this embodiment, based on the embodiment shown in FIG. 4, a plurality of optional implementations are added, and can improve uplink data sending efficiency.

Figure 6:
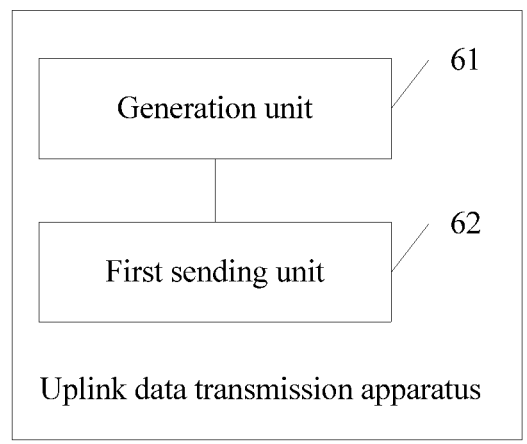
FIG. 6 is a schematic structural diagram of an uplink data transmission apparatus according to an embodiment of the present disclosure.

Referring to FIG. 6, FIG. 6 is a schematic structural diagram of an uplink data transmission apparatus according to an embodiment of the present disclosure. As shown in FIG. 6, the uplink data transmission apparatus includes a generation unit 61 and a first sending unit 62.

The generation unit 61 is configured to generate uplink scheduling information according to an obtained scheduling information generation rule. The uplink scheduling information includes at least a modulation and coding scheme.

The first sending unit 62 is configured to: when uplink data needs to be sent, modulate and encode the uplink data by using the modulation and coding scheme, and send the modulated and encoded uplink data to an access device.

In this embodiment, the uplink scheduling information further includes a transport block size. The transport block size may be determined according to the modulation and coding scheme and a quantity of used physical resource blocks, and the modulated and encoded uplink data is sent in the transport block size.

Figure 7:
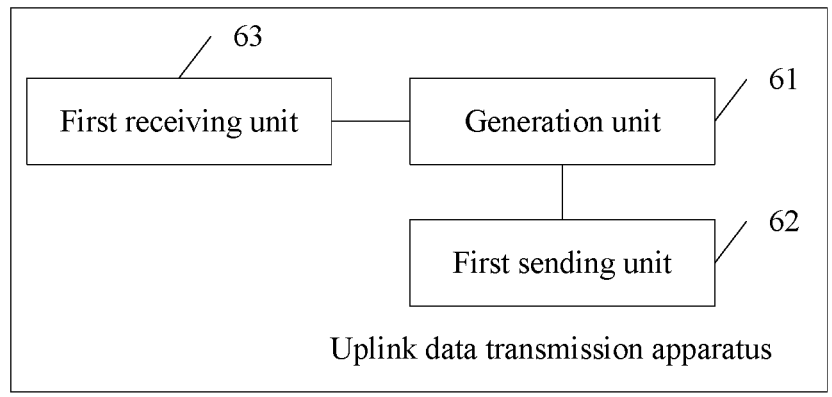
FIG. 7 is a schematic structural diagram of another uplink data transmission apparatus according to an embodiment of the present disclosure.

In this embodiment, as shown in FIG. 7, the apparatus may further include:

a first receiving unit 63, configured to receive a correspondence that is sent by the access device and that is between a modulation and coding scheme and uplink physical resource information.

The first sending unit 62 may be configured to: select, according to the correspondence, uplink physical resource information that can use the modulation and coding scheme, and send the modulated and encoded uplink data to the access device by using an uplink physical resource corresponding to the selected uplink physical resource information, so that the access device determines, according to the uplink physical resource, a modulation and coding scheme used by the uplink data.

In this embodiment, the generation unit 61 may be configured to: obtain a current uplink interference level, and obtain, according to an obtained mapping relationship between an uplink interference level and uplink scheduling information, uplink scheduling information corresponding to the current uplink interference level; or the generation unit 61 may be configured to: obtain current uplink load, and obtain, according to an obtained mapping relationship between uplink load and uplink scheduling information, uplink scheduling information corresponding to the current uplink load; or the generation unit 61 may be configured to: obtain current location information, and obtain, according to an obtained mapping relationship between location information and uplink scheduling information, uplink scheduling information corresponding to the current location information, where the location information includes at least one of the following:

available transmit power, user equipment (UE) transmission power headroom (UPH), a path loss, or signal strength; or the generation unit 61 may be configured to: obtain a downlink channel condition, estimate a current uplink channel condition according to the downlink channel condition, and obtain, according to an obtained mapping relationship between an uplink channel condition and uplink scheduling information, uplink scheduling information corresponding to the current uplink channel condition.

Figure 8:
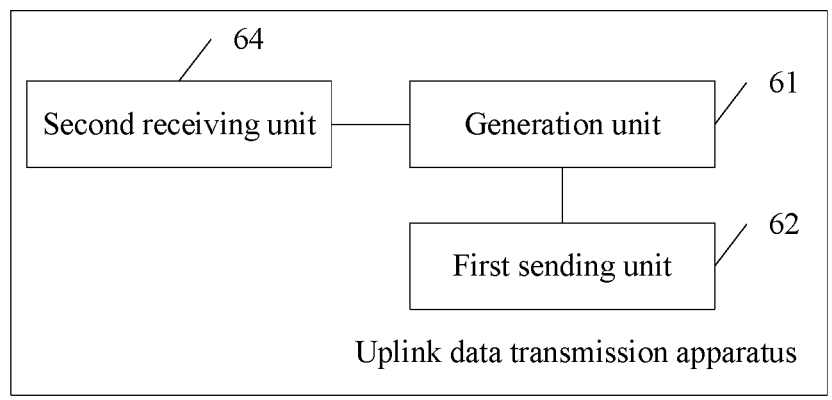
FIG. 8 is a schematic structural diagram of another uplink data transmission apparatus according to an embodiment of the present disclosure.

In this embodiment, as shown in FIG. 8, the apparatus may further include:

a second receiving unit 64, configured to receive indication information sent by the access device, where the indication information is used to indicate N types of uplink scheduling information that are allowed to be used to send the uplink data, and N is an integer greater than or equal to 2.

In this embodiment, the first sending unit 62 may be configured to send uplink information to the access device by using uplink data channel. The uplink information includes the modulated and encoded uplink data, and further includes control information, and the control information is at least used to indicate one type of information included in the uplink scheduling information.

In this embodiment, the first sending unit 62 may be configured to send the modulated and encoded uplink data to the access device by using an uplink data channel.

Figure 9:
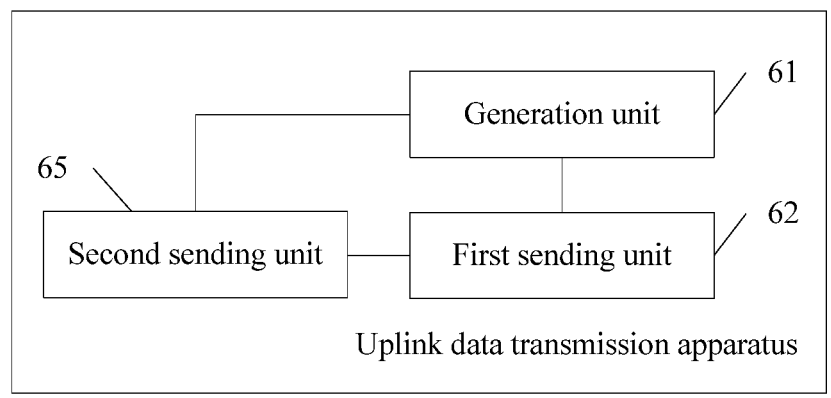
FIG. 9 is a schematic structural diagram of another uplink data transmission apparatus according to an embodiment of the present disclosure.

As shown in FIG. 9, the apparatus may further include:

a second sending unit 65, configured to send control information to the access device by using an uplink control channel, where the control information is at least used to indicate one type of information included in the uplink scheduling information.

In this implementation, the control information may be further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

In this implementation, the uplink control channel may be a dedicated uplink control channel; or the uplink control channel may be a contended uplink control channel, the control information may be further used to indicate an identifier of user equipment, and the control information is control information scrambled by using scrambling information, where the scrambling information includes the identifier of the user equipment, a predefined character sequence, or a preconfigured character sequence.

In this embodiment, the uplink scheduling information may further include at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

It should be noted that the uplink data transmission apparatus provided in this embodiment may be an apparatus that implements the methods described in the embodiments shown in FIG. 1 and FIG. 2, and implementations of the methods described in the embodiments shown in FIG. 1 and FIG. 2 may be applied to the uplink data transmission apparatus in this embodiment. In addition, the uplink data transmission apparatus may be user equipment.

In this embodiment, the uplink scheduling information is generated according to the obtained scheduling information generation rule, where the uplink scheduling information includes at least the modulation and coding scheme; and when the uplink data needs to be sent, the uplink data is modulated and encoded by using the modulation and coding scheme, and the modulated and encoded uplink data is sent to the access device. In this way, when the uplink data is sent, there is no need to establish an RRC connection or a non-access stratum connection or send a scheduling request or a random access request. Therefore, uplink data sending efficiency of the user equipment is improved.

Figure 10:
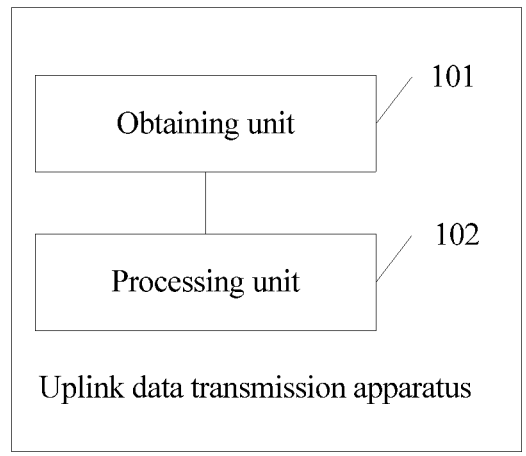
FIG. 10 is a schematic structural diagram of another uplink data transmission apparatus according to an embodiment of the present disclosure.

As shown in FIG. 10, FIG. 10 is a schematic structural diagram of another uplink data transmission apparatus according to an embodiment of the present disclosure. As shown in FIG. 10, the uplink data transmission apparatus includes an obtaining unit 101 and a processing unit 102.

The obtaining unit 101 is configured to obtain uplink scheduling information used by user equipment to send uplink data. The uplink scheduling information is uplink scheduling information generated by the user equipment according to an obtained scheduling information generation rule, and the uplink scheduling information includes at least a modulation and coding scheme.

The processing unit 102 is configured to perform, by using the uplink scheduling information, receiving processing on the uplink data sent by the user equipment. The uplink data is modulated and encoded by the user equipment by using the modulation and coding scheme.

In this embodiment, the uplink scheduling information may further include a transport block size. The transport block size may be determined according to the modulation and coding scheme and a quantity of used physical resource blocks, and the uplink data is sent in the transport block size.

Figure 11:
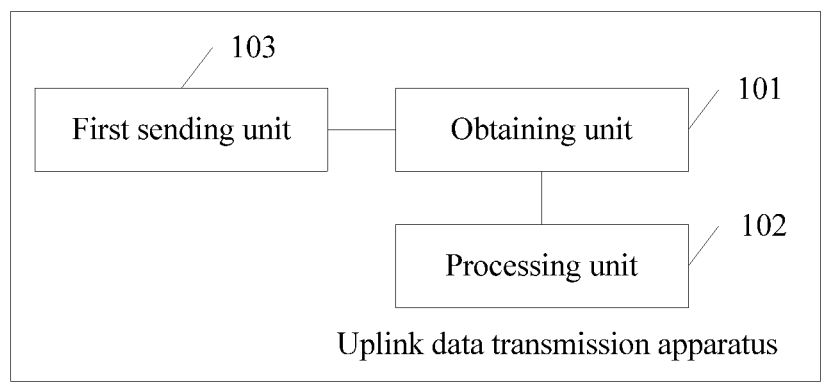
FIG. 11 is a schematic structural diagram of another uplink data transmission apparatus according to an embodiment of the present disclosure.

In this embodiment, as shown in FIG. 11, the apparatus may further include:

a first sending unit 103, configured to send a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information.

The obtaining unit 101 may be configured to: select, according to the correspondence, a modulation and coding scheme corresponding to the uplink physical resource used by the user equipment to send the uplink data, and use the selected modulation and coding scheme as a modulation and coding scheme used by the user equipment to send the uplink data.

Figure 12:
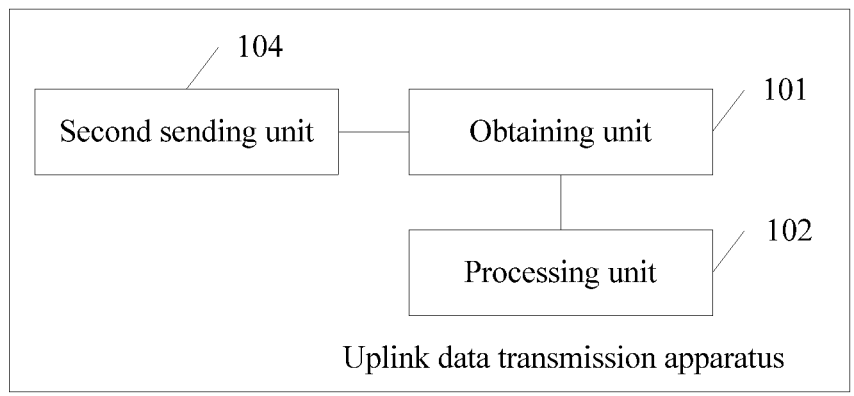
FIG. 12 is a schematic structural diagram of another uplink data transmission apparatus according to an embodiment of the present disclosure.

In this embodiment, as shown in FIG. 12, the apparatus may further include:

a second sending unit 104, configured to send indication information to the user equipment, where the indication information is used to indicate N types of uplink scheduling information that are allowed to be used by the user equipment to send the uplink data, and N is an integer greater than or equal to 2.

The obtaining unit 101 may be configured to detect, in the N types of uplink scheduling information in a blind detection manner, the uplink scheduling information used by the user equipment to send the uplink data.

In this embodiment, the obtaining unit 101 may be configured to obtain, according to control information sent by the user equipment, the uplink scheduling information used by the user equipment to send the uplink data. The control information is at least used to indicate one type of information included in the uplink scheduling information.

In this implementation, the control information may indicate the modulation and coding scheme or the transport block size included in the uplink scheduling information.

The obtaining unit 101 may be configured to select, according to an obtained mapping relationship between a modulation and coding scheme and uplink scheduling information, uplink scheduling information corresponding to the modulation and coding scheme as the uplink scheduling information used by the user equipment to send the uplink data; or the obtaining unit 101 may be configured to select, according to an obtained mapping relationship between a transport block size and uplink scheduling information, uplink scheduling information corresponding to the transport block size as the uplink scheduling information used by the user equipment to send the uplink data.

Figure 13:
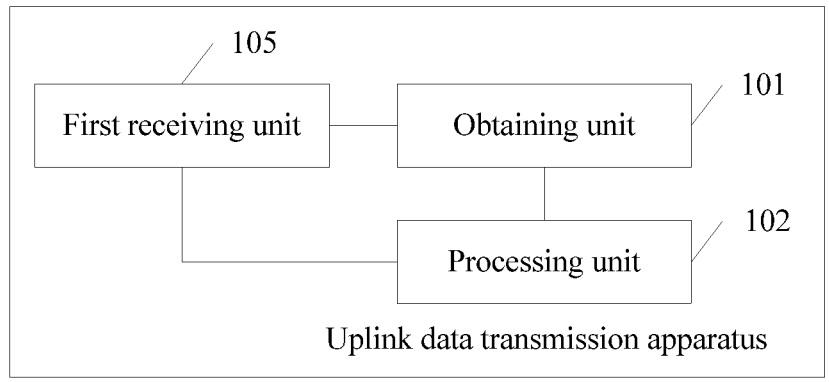
FIG. 13 is a schematic structural diagram of another uplink data transmission apparatus according to an embodiment of the present disclosure.

In this implementation, as shown in FIG. 13, the apparatus may further include:

a first receiving unit 105, configured to receive uplink information sent by the user equipment by using an uplink data channel, where the uplink information includes the uplink data and the control information.

Figure 14:
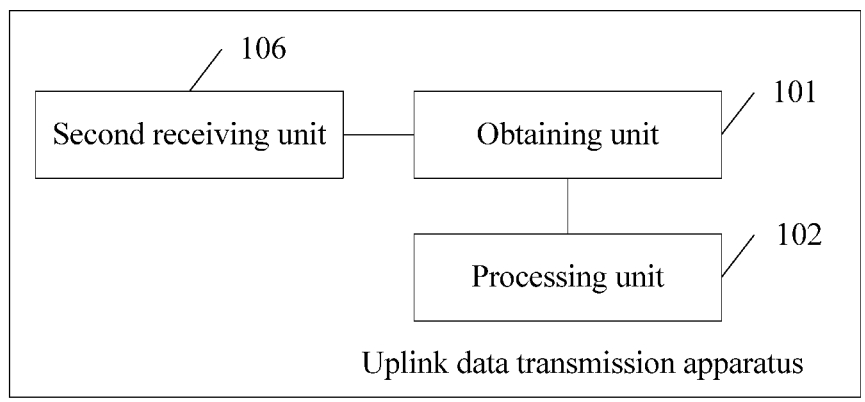
FIG. 14 is a schematic structural diagram of another uplink data transmission apparatus according to an embodiment of the present disclosure.

In this implementation, as shown in FIG. 14, the apparatus may further include:

a second receiving unit 106, configured to receive the control information sent by the user equipment by using an uplink control channel.

In this implementation, the control information may be further used to indicate a resource location of the uplink data on the uplink data channel, or the control information may be further used to indicate a relative fixed location offset between a resource location of the uplink data on the uplink data channel and a resource location of the control information on the uplink control channel, or the control information may be further used to indicate a relative offset between physical resource numbers of a resource location of the uplink data on the uplink data channel and a resource location of the control information on the uplink control channel.

In this implementation, the uplink control channel may be a dedicated uplink control channel; or the uplink control channel may be a contended uplink control channel, the control information may be further used to indicate an identifier of the user equipment, and the control information may be control information scrambled by using scrambling information, where the scrambling information includes the identifier of the user equipment, a predefined character sequence, or a preconfigured character sequence.

In this embodiment, the uplink scheduling information may further include at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

Figure 15:
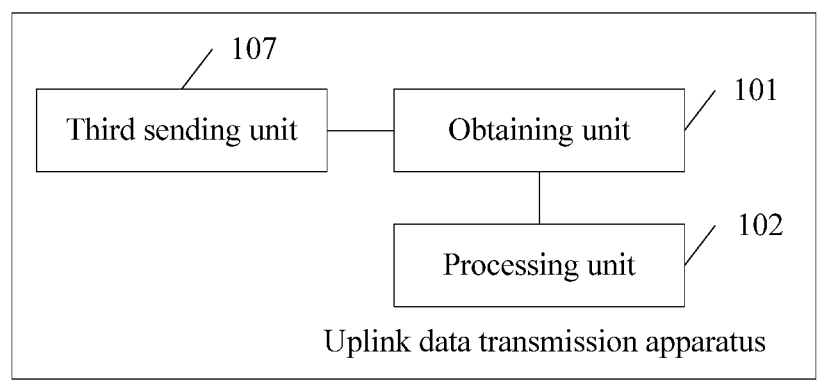
FIG. 15 is a schematic structural diagram of another uplink data transmission apparatus according to an embodiment of the present disclosure.

In this embodiment, as shown in FIG. 15, the apparatus further includes:

a third sending unit 107, configured to send the scheduling information generation rule to the user equipment, so that the user equipment generates the uplink scheduling information according to the scheduling information generation rule.

It should be noted that the uplink data transmission apparatus provided in this embodiment may be an apparatus that implements the methods described in the embodiments shown in FIG. 4 and FIG. 5, and implementations of the methods described in the embodiments shown in FIG. 4 and FIG. 5 may be applied to the uplink data transmission apparatus in this embodiment. In addition, the uplink data transmission apparatus may be user equipment.

In this embodiment, the uplink scheduling information used by the user equipment to send the uplink data is obtained, where the uplink scheduling information is the uplink scheduling information generated by the user equipment according to the obtained scheduling information generation rule, and the uplink scheduling information includes at least the modulation and coding scheme; and receiving processing is performed, by using the uplink scheduling information, on the uplink data sent by the user equipment, where the uplink data is modulated and encoded by the user equipment by using the modulation and coding scheme. In this way, when the uplink data is sent, there is no need to establish an RRC connection or a non-access stratum connection or send a scheduling request or a random access request. Therefore, uplink data sending efficiency of the user equipment is improved.

Figure 16:
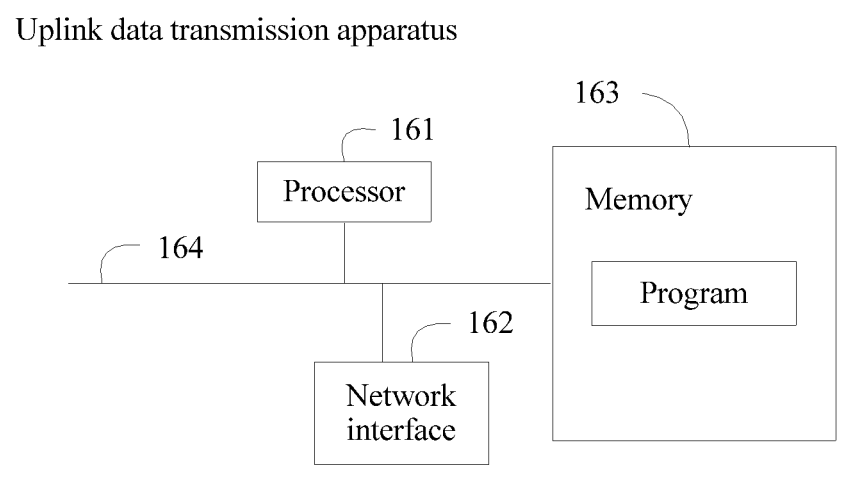
FIG. 16 is a schematic structural diagram of another uplink data transmission apparatus according to an embodiment of the present disclosure.

Referring to FIG. 16, FIG. 16 is a schematic structural diagram of another uplink data transmission apparatus according to an embodiment of the present disclosure. As shown in FIG. 16, the uplink data transmission apparatus includes a processor 161, a network interface 162, a memory 163, and a communications bus 164. The communications bus 164 is configured to implement connections and communication between the processor 161, the network interface 162, and the memory 163, and the processor 161 executes a program stored in the memory 163, to implement the following method:

generating uplink scheduling information according to an obtained scheduling information generation rule, where the uplink scheduling information includes at least a modulation and coding scheme; and when uplink data needs to be sent, modulating and encoding the uplink data by using the modulation and coding scheme, and sending the modulated and encoded uplink data to an access device.

In this embodiment, the uplink scheduling information may further include a transport block size. The transport block size may be determined according to the modulation and coding scheme and a quantity of used physical resource blocks, and the modulated and encoded uplink data is sent in the transport block size.

In this embodiment, the processor 161 may be further configured to execute the following program:

receiving a correspondence that is sent by the access device and that is between a modulation and coding scheme and uplink physical resource information; and the program, executed by the processor, of sending the modulated and encoded uplink data to an access device includes:

selecting, according to the correspondence, uplink physical resource information that can use the modulation and coding scheme, and sending the modulated and encoded uplink data to the access device by using an uplink physical resource corresponding to the selected uplink physical resource information, so that the access device determines, according to the uplink physical resource, a modulation and coding scheme used by the uplink data.

In this embodiment, the program, executed by the processor 161, of generating uplink scheduling information according to an obtained scheduling information generation rule may include:

obtaining a current uplink interference level, and obtaining, according to an obtained mapping relationship between an uplink interference level and uplink scheduling information, uplink scheduling information corresponding to the current uplink interference level; or obtaining current uplink load, and obtaining, according to an obtained mapping relationship between uplink load and uplink scheduling information, uplink scheduling information corresponding to the current uplink load; or obtaining current location information, and obtaining, according to an obtained mapping relationship between location information and uplink scheduling information, uplink scheduling information corresponding to the current location information, where the location information includes at least one of the following:

available transmit power, user equipment (UE) transmission power headroom (UPH), a path loss, or signal strength; or obtaining a downlink channel condition, estimating a current uplink channel condition according to the downlink channel condition, and obtaining, according to an obtained mapping relationship between an uplink channel condition and uplink scheduling information, uplink scheduling information corresponding to the current uplink channel condition.

In this embodiment, before the processor 161 executes the program of generating uplink scheduling information according to an obtained scheduling information generation rule, the processor 161 may be further configured to execute the following program:

receiving indication information sent by the access device, where the indication information is used to indicate N types of uplink scheduling information that are allowed to be used to send the uplink data, and N is an integer greater than or equal to 2.

In this embodiment, the program, executed by the processor 161, of sending the modulated and encoded uplink data to an access device may include:

sending uplink information to the access device by using an uplink data channel, where the uplink information includes the modulated and encoded uplink data, and further includes control information, and the control information is at least used to indicate one type of information included in the uplink scheduling information.

In this embodiment, the program, executed by the processor 161, of sending the modulated and encoded uplink data to an access device may include:

sending the modulated and encoded uplink data to the access device by using an uplink data channel.

The processor 161 may be further configured to execute the following program:

sending control information to the access device by using an uplink control channel, where the control information is at least used to indicate one type of information included in the uplink scheduling information.

In this embodiment, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a location of the control information on the uplink control channel.

In this embodiment, the uplink control channel is a dedicated uplink control channel; or the uplink control channel is a contended uplink control channel, the control information is further used to indicate an identifier of user equipment, and the control information is control information scrambled by using scrambling information, where the scrambling information includes the identifier of the user equipment, a predefined character sequence, or a preconfigured character sequence.

In this embodiment, the uplink scheduling information further includes at least one of the following:

a transmission time interval, resource information of a data channel, indication information indicating whether there is uplink data sending, duration in which the uplink data channel is used, or at least one of hybrid automatic repeat request (HARQ) process information, a retransmission version, or retransmission occupation duration.

It should be noted that the uplink data transmission apparatus provided in this embodiment may be an apparatus that implements the methods described in the embodiments shown in FIG. 1 and FIG. 2, and implementations of the methods described in the embodiments shown in FIG. 1 and FIG. 2 may be applied to the uplink data transmission apparatus in this embodiment. In addition, the uplink data transmission apparatus may be user equipment.

In this embodiment, the uplink scheduling information is generated according to the obtained scheduling information generation rule, where the uplink scheduling information includes at least the modulation and coding scheme; and when the uplink data needs to be sent, the uplink data is modulated and encoded by using the modulation and coding scheme, and the modulated and encoded uplink data is sent to the access device. In this way, when the uplink data is sent, there is no need to establish an RRC connection or a non-access stratum connection or send a scheduling request or a random access request. Therefore, uplink data sending efficiency of the user equipment is improved.

Figure 17:
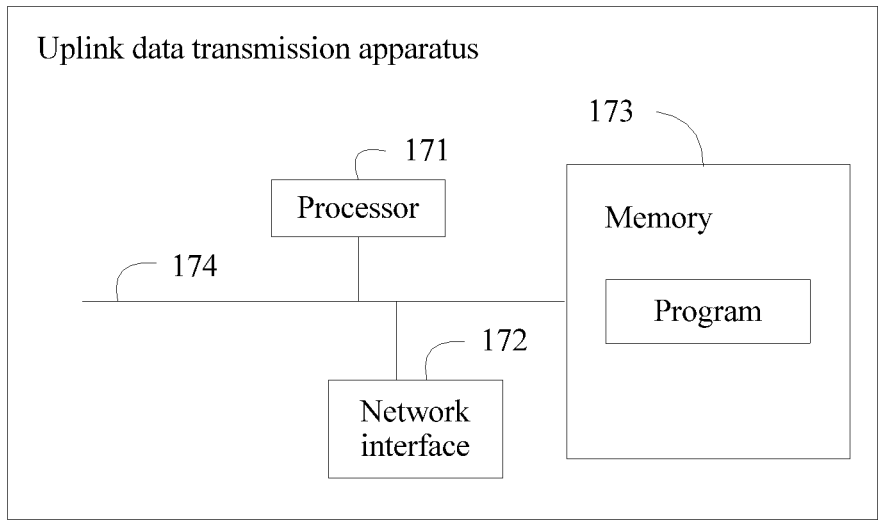
FIG. 17 is a schematic structural diagram of another uplink data transmission apparatus according to an embodiment of the present disclosure.

Referring to FIG. 17, FIG. 17 is a schematic structural diagram of another uplink data transmission apparatus according to an embodiment of the present disclosure. As shown in FIG. 17, the uplink data transmission apparatus includes a processor 171, a network interface 172, a memory 173, and a communications bus 174. The communications bus 174 is configured to implement connections and communication between the processor 171, the network interface 172, and the memory 173, and the processor 171 executes a program stored in the memory 173, to implement the following method:

obtaining uplink scheduling information used by user equipment to send uplink data, where the uplink scheduling information is uplink scheduling information generated by the user equipment according to an obtained scheduling information generation rule, and the uplink scheduling information includes at least a modulation and coding scheme; and performing, by using the uplink scheduling information, receiving processing on the uplink data sent by the user equipment, where the uplink data is modulated and encoded by the user equipment by using the modulation and coding scheme.

In this embodiment, the uplink scheduling information may further include a transport block size. The transport block size may be determined according to the modulation and coding scheme and a quantity of used physical resource blocks, and the uplink data is sent in the transport block size.

In this embodiment, the processor 171 may be further configured to execute the following program:

sending a correspondence between a modulation and coding scheme and uplink physical resource information to the user equipment, so that the user equipment selects, according to the correspondence, uplink physical resource information that can use the modulation and coding scheme, and sends the uplink data by using an uplink physical resource corresponding to the selected uplink physical resource information; and the program, executed by the processor 171, of obtaining uplink scheduling information used by user equipment to send uplink data may include:

selecting, according to the correspondence, a modulation and coding scheme corresponding to the uplink physical resource used by the user equipment to send the uplink data, and using the selected modulation and coding scheme as a modulation and coding scheme used by the user equipment to send the uplink data.

In this embodiment, the processor 171 may be further configured to execute the following program:

sending indication information to the user equipment, where the indication information is used to indicate N types of uplink scheduling information that are allowed to be used by the user equipment to send the uplink data, and N is an integer greater than or equal to 2; and the program, executed by the processor 171, of obtaining uplink scheduling information used by user equipment to send uplink data may include:

detecting, in the N types of uplink scheduling information in a blind detection manner, the uplink scheduling information used by the user equipment to send the uplink data.

In this embodiment, the program, executed by the processor 171, of obtaining uplink scheduling information used by user equipment to send uplink data may include:

obtaining, according to control information sent by the user equipment, the uplink scheduling information used by the user equipment to send the uplink data, where the control information is at least used to indicate one type of information included in the uplink scheduling information.

In this implementation, the control information may indicate the modulation and coding scheme or the transport block size included in the uplink scheduling information.

The program, executed by the processor 171, of obtaining, according to control information sent by the user equipment, the uplink scheduling information used by the user equipment to send the uplink data may include:

selecting, according to an obtained mapping relationship between a modulation and coding scheme and uplink scheduling information, uplink scheduling information corresponding to the modulation and coding scheme as the uplink scheduling information used by the user equipment to send the uplink data; or selecting, according to an obtained mapping relationship between a transport block size and uplink scheduling information, uplink scheduling information corresponding to the transport block size as the uplink scheduling information used by the user equipment to send the uplink data.

In this embodiment, the processor 171 may be further configured to execute the following program:

receiving uplink information sent by the user equipment by using an uplink data channel, where the uplink information includes the uplink data and the control information.

In this embodiment, the processor 171 may be further configured to execute the following program:

receiving the control information sent by the user equipment by using an uplink control channel.

In this implementation, the control information is further used to indicate a resource location of the uplink data on the uplink data channel, or the control information is further used to indicate a relative fixed location offset between a resource location of the uplink data on the uplink data channel and a resource location of the control information on the uplink control channel, or the control information is further used to indicate a relative offset between physical resource numbers of a resource location of the uplink data on the uplink data channel and a resource location of the control information on the uplink control channel.

In this implementation, the uplink control channel is a dedicated uplink control channel; or the uplink control channel is a contended uplink control channel, the control information is further used to indicate an identifier of the user equipment, and the control information is control information scrambled by using scrambling information, where the scrambling information includes the identifier of the user equipment, a predefined character sequence, or a preconfigured character sequence.

In this embodiment, the uplink scheduling information may further include at least one of the following:

a transmission time interval, resource information of a data channel, indication information indicating whether there is uplink data sending, duration in which the uplink data channel is used, or at least one of HARQ process information, a retransmission version, or retransmission occupation duration.

In this embodiment, the processor 171 may be further configured to execute the following program:

sending the scheduling information generation rule to the user equipment, so that the user equipment generates the uplink scheduling information according to the scheduling information generation rule.

It should be noted that the uplink data transmission apparatus provided in this embodiment may be an apparatus that implements the methods described in the embodiments shown in FIG. 4 and FIG. 5, and implementations of the methods described in the embodiments shown in FIG. 4 and FIG. 5 may be applied to the uplink data transmission apparatus in this embodiment. In addition, the uplink data transmission apparatus may be user equipment.

In this embodiment, the uplink scheduling information used by the user equipment to send the uplink data is obtained, where the uplink scheduling information is the uplink scheduling information generated by the user equipment according to the obtained scheduling information generation rule, and the uplink scheduling information includes at least the modulation and coding scheme; and receiving processing is performed, by using the uplink scheduling information, on the uplink data sent by the user equipment, where the uplink data is modulated and encoded by the user equipment by using the modulation and coding scheme. In this way, when the uplink data is sent, there is no need to establish an RRC connection or a non-access stratum connection or send a scheduling request or a random access request. Therefore, uplink data sending efficiency of the user equipment is improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disc, an optical disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An apparatus comprising:
   at least one processor; and
   a non-transitory memory storing instructions executable by the at least one processor, wherein the instructions, when executed by the at least one processor, cause the apparatus to:
      send uplink information to an access device using an uplink data channel, wherein the uplink information comprises uplink data and control information, the control information being separate from the uplink data and the control information indicating a resource location of the uplink data on the uplink data channel, and further indicating at least one of hybrid automatic repeat request (HARQ) retransmission process information or a retransmission version during retransmission.

2. The apparatus according to claim 1, the uplink data being data modulated and encoded with a modulation and coding scheme.

3. The apparatus according to claim 2, wherein the instructions, when executed by the at least one processor, further cause the apparatus to:
   receive, from the access device, a correspondence between the modulation and coding scheme and uplink physical resource information;
   select, according to the correspondence, uplink physical resource information suitable for the modulation and coding scheme; and
   send the uplink data to the access device using an uplink physical resource corresponding to the selected uplink physical resource information.

4. A method, comprising:
   sending, by an apparatus, uplink information to an access device using an uplink data channel, wherein the uplink information comprises uplink data and control information, the control information being separate from the uplink data and the control information indicating a resource location of the uplink data on the uplink data channel, and further indicating at least one of hybrid automatic repeat request (HARQ) retransmission process information or a retransmission version during retransmission.

5. The method according to claim 4, the uplink data being data modulated and encoded with a modulation and coding scheme.

6. The method according to claim 5, further comprising:
   receiving, from the access device, a correspondence between the modulation and coding scheme and uplink physical resource information;
   selecting, according to the correspondence, uplink physical resource information suitable for the modulation and coding scheme; and
   sending the uplink data to the access device using an uplink physical resource corresponding to the selected uplink physical resource information.

7. An apparatus applied for an access device comprising:
   at least one processor; and
   a non-transitory memory storing instructions executable by the at least one processor; wherein, the instructions, when executed by the at least one processor, cause the apparatus to:
      receive uplink information from a terminal using an uplink data channel, wherein the uplink information comprises uplink data and control information, the control information being separate from the uplink data and the control information indicating a resource location of the uplink data on the uplink data channel, and further indicating at least one of hybrid automatic repeat request (HARQ) retransmission process information or a retransmission version during retransmission; and
      perform receiving processing on the uplink data using the control information.

8. The apparatus according to claim 7, wherein the uplink data is data modulated and encoded with a modulation and coding scheme.

9. The apparatus according to claim 8, wherein, the instructions, when executed by the at least one processor, further cause the apparatus to:
   send, to the terminal, a correspondence between the modulation and coding scheme and uplink physical resource information.

* * * * *